(12) United States Patent
Norman et al.

(10) Patent No.: US 8,230,497 B2
(45) Date of Patent: Jul. 24, 2012

(54) METHOD OF IDENTIFYING SOFTWARE VULNERABILITIES ON A COMPUTER SYSTEM

(75) Inventors: Andrew Patrick Norman, Bristol (GB); John Melvin Brawn, San Jose, CA (US); John P Scrimsher, Albany, OR (US); Jonathan Griffin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3246 days.

(21) Appl. No.: 10/287,125

(22) Filed: Nov. 4, 2002

(65) Prior Publication Data

US 2004/0088565 A1    May 6, 2004

(51) Int. Cl.
*G06F 12/14* (2006.01)
*G06F 21/00* (2006.01)

(52) U.S. Cl. ............... 726/22; 726/23; 726/25; 726/26; 709/229

(58) Field of Classification Search ............ 726/22
See application file for complete search history.

(56) References Cited

U.S. PATENT DOCUMENTS

| | | | |
|---|---|---|---|
| 6,205,552 B1 * | 3/2001 | Fudge | 726/25 |
| 6,647,400 B1 * | 11/2003 | Moran | 707/999.205 |
| 6,826,697 B1 * | 11/2004 | Moran | 726/23 |
| 6,925,443 B1 * | 8/2005 | Baggett et al. | 705/7.32 |
| 6,988,208 B2 * | 1/2006 | Hrabik et al. | 726/23 |
| 6,996,843 B1 * | 2/2006 | Moran | 726/23 |
| 7,013,395 B1 * | 3/2006 | Swiler et al. | 726/25 |
| 7,031,945 B1 | 4/2006 | Donner | |
| 7,032,114 B1 * | 4/2006 | Moran | 713/187 |
| 7,065,657 B1 | 6/2006 | Moran | |
| 2001/0034847 A1 * | 10/2001 | Gaul, Jr. | 713/201 |
| 2003/0084320 A1 | 5/2003 | Tarquini et al. | |

FOREIGN PATENT DOCUMENTS

WO    WO-01/90892    11/2001

OTHER PUBLICATIONS

Jiwnani, Kanta. Zelkowitz, Marvin. Maintaining Software with a Security Perspective. International Conference on Software Maintenance. Pub. Date: 2002. Relevant pp. 194-203. Found on the World Wide Web at: http://ieeexplore.ieee.org/stamp/stamp.jsp?tp=&arnumber=1167766.*
Ward, Cheese Beats Crackers, BBC News, May 22, 2001.

* cited by examiner

*Primary Examiner* — Nathan Flynn
*Assistant Examiner* — Jeremiah Avery

(57) ABSTRACT

A method of identifying a software vulnerability on a computer system is disclosed in which the computer system has software stored thereon and is connected to a management system over a computer network. The method comprises the steps of: applying an interrogation program to the software, the interrogation program being capable of exploiting a known software vulnerability if it is present in the software to which the interrogation program is applied; in the event that the software vulnerability is exploited by the interrogation program, operating the interrogation program to generate a set of management information from which can be derived the identification of the computer system; and sending the management information to the management system.

10 Claims, 6 Drawing Sheets

| $V_n$ | Exploit Program |
|---|---|
| $V_1$ | $E_1$ |
| $V_2$ | $E_2$ |
| $V_3$ | $E_3$ |
| $V_4$ | $E_4$ |

METHOD OF IDENTIFYING SOFTWARE VULNERABILITIES ON A COMPUTER SYSTEM

SUMMARY OF THE INVENTION

This invention relates to a method of identifying software vulnerabilities on a computer system. The invention also relates to a method of identifying software vulnerabilities in a computer network comprising a plurality of computer systems.

BACKGROUND OF THE INVENTION

Computer networks are used in many types of organisation, for example within business, industrial and educational organisations. A computer network typically comprises a number of computer systems interconnected by data communications links. Computer networks allow data to be shared between users of individual organisations, and also between users of different organisations.

Computer systems connected to such computer networks operate using software executed on the systems. Such software may contain vulnerabilities which render the software, and computer systems running the software, susceptible to interference by unauthorised means. As will be appreciated by those skilled in the art, a software vulnerability may be considered a characteristic of that software which renders it susceptible to processing operations not intended to be permitted or performed by that software. Examples of software vulnerabilities include software features that enable hackers to manipulate the software in an unauthorised way or features that enable malicious mobile code (worms, executable computer viruses, etc.) to access and/or manipulate the software. Knowledge of a software vulnerability enables the formulation of so-called 'exploit' programs which are specifically designed to take advantage of such software vulnerabilities.

Taking a well-known example, in July 2001, a computer virus was discovered that exploited a software vulnerability in a particular web server application. The virus was known as the "Code Red" virus. The virus exploited a stack/buffer overflow vulnerability in the indexing system of the web server application and used a specially designed hypertext transfer protocol (http) request that, when applied to the web server application, caused malicious code to take control of the web server. The primary behaviour of the malicious code was to propagate across networks very rapidly, and indeed, it was estimated that the Code Red virus was capable of infecting approximately half a million Internet Protocol (IP) addresses per day. A further effect was to deface web-sites present on the 'infected' server.

Thus, it will be appreciated that since computer networks facilitate the transfer of data across a large number of computer systems in a relatively short space of time, such vulnerabilities can enable malicious mobile code to propagate rapidly across large network areas. The costs involved in rectifying 'infected' systems can be very large and it follows that early identification of such vulnerabilities is important so that appropriate remedial action can be taken before the vulnerability is exploited.

A conventional method of determining whether computer systems on a network contain vulnerabilities is to perform a scan of Internet Protocol (IP) addresses on the network to identify the software programs present on computer systems having those IP addresses. The result is a list of IP addresses and associated software programs (including their version number). This information is collected centrally, e.g. by an organisation's IT department, and compared with a central database of known vulnerabilities associated with the identified software versions. It is then the task of the IT department to manually identify the physical machine/user from the IP addresses. This can be a difficult, time-consuming and costly task since the allocation of IP addresses does not necessarily correspond to the physical arrangement of computer systems, and the same IP address can even be assigned to different machines at different times. The task of transporting the appropriate remedy, e.g. a software 'patch', to the affected computer system or user usually involves some manual element. Once the computer system or user is identified, this process may involve sending an email to the user informing them that they themselves need to apply the patch and where the patch is stored. It is then up to the user to effect the remedy in their own time.

It will be appreciated that this conventional method relies heavily on the accuracy of the information in the database which relates known vulnerabilities to identified software versions. Inaccurate information in the database can result in no vulnerability being indicated where, in fact, one exists. Alternatively, a vulnerability could be indicated when one does not exist. As will be appreciated from the above, the remediation method is also slow and can leave computer systems susceptible to virus attacks.

It is an object of the present invention to provide an improved method of identifying software vulnerabilities on a computer system, and an improved method of identifying software vulnerabilities in a computer network. It is also an object of the invention to provide an improved method of remediating identified software vulnerabilities.

SUMMARY OF THE INVENTION

According to a first aspect of the invention, there is provided a method of identifying a software vulnerability on a computer system having software stored thereon, the computer system being connected to a management system over a computer network, the method comprising: applying an interrogation program to the software, the interrogation program being capable of exploiting a known software vulnerability if it is present in the software to which the interrogation program is applied; in the event that the software vulnerability is exploited by the interrogation program, operating the interrogation program to generate management information from which can be derived the identification of the computer system; and sending the management information to the management system.

The method provides for accurate determination of whether or not a software vulnerability is present on the software of a computer system. By interrogating the software using a program capable of exploiting a known software vulnerability, it is possible to determine accurately whether that software vulnerability is present from the result of the interrogation. The result of the interrogation will generate management information from which can be derived an indication of the computer system, this information then being sent to a management system over a network connection.

The interrogation program will be some form of code, at least part of which is able to exploit a known vulnerability. For example, the interrogation program may simply be embodied in a URL or 'http' request. Alternatively, the interrogation program may be an executable file, although this is not essential. Other forms of interrogation program can be envisaged.

As mentioned previously, a software vulnerability may be considered a characteristic of the software which renders it susceptible to processing operations not intended to be permitted or performed by that software. Examples of software vulnerabilities include software features that enable hackers to manipulate the software in an unauthorised way or features that enable malicious mobile code (worms, executable computer viruses etc.) to access and/or manipulate the software. A buffer overflow attack (which could include a stack overflow attack) is an example of a processing operation which takes advantage of a software vulnerability.

Preferably, a plurality of interrogation programs is applied to the computer system, each interrogation program being capable of exploiting a different known software vulnerability if it is present in the software to which the interrogation programs are applied, and wherein, in the event that the software vulnerability is exploited by one of the interrogation programs, the method further comprises operating that respective interrogation program to generate a further set of management information from which can be derived the identification of the software vulnerability so exploited.

The interrogation program may further be arranged to remediate the known software vulnerability in response to it being identified. This is preferably performed automatically and electronically using the identity information corresponding to the computer system having the software vulnerability. It is particularly advantageous if the identity information is a network address corresponding to the computer system, e.g. an IP address, so that the management computer can automatically send, or cause to be sent, a remediation program over the network connection to the relevant computer system. This enables rapid remediation of identified software vulnerabilities, which is important for preventing a future 'attack' on that vulnerability.

According to a second aspect of the invention, there is provided a method of identifying software vulnerabilities in a computer network, the computer network comprising a plurality of computer systems having software stored thereon, a scanning system capable of sending at least one interrogation program to each of the computer systems, the at least one interrogation program being arranged to exploit a known software vulnerability if it is present in the software of the computer systems to which the interrogation program is applied, and a management system, the method comprising: operating the scanning system to apply the at least one interrogation program to the computer systems thereby to determine whether a known software vulnerability is exploited; in the event that a known software vulnerability is exploited, operating the interrogation program to generate management information at the computer system on which the known software vulnerability was exploited, the management information at least identifying the computer system on which the known software vulnerability was exploited; and sending the generated management information to the management system.

The scanning system may send the or each interrogation program to each computer system concurrently, i.e. in parallel. The scanning may be divided across particular address ranges, e.g. IP address ranges, of the computer network.

Each computer system may have an associated network address and the management information sent to the management system may include the network address of the computer system on which the known software vulnerability was identified. The network address may be the IP address of the computer system.

The scanning system and management system may be implemented on a single computer system. Alternatively, the scanning system and management system may be implemented on separate computer systems.

The at least one interrogation program may further be arranged to remediate the known software vulnerability it is arranged to exploit, and in the event that the interrogation program exploits a software vulnerability, the method can further comprise operating that interrogation program to remediate said software vulnerability. In this case, the management information generated by the at least one interrogation program may further comprise information indicative of the remediation operation performed. The remediation operation can be partial, and the management information generated by the at least one interrogation program can further comprise information indicative of the remediation operation performed and any remediation operation required.

In the event that a software vulnerability is exploited on one of the computer systems, the interrogation program may further operate to identify viruses present on said computer system, the management information including an identification of the or each virus so identified. Thus, since it is possible that an identified software vulnerability may already have been exploited by malicious code, such as a virus, it may be important to repair any damage done by that code before the actual vulnerability is remediated.

In response to receiving management information from a computer system indicating the presence of a software vulnerability, the management system may retrieve a remediation program appropriate to said known software vulnerability and send the retrieved remediation program to said computer system. The management system can retrieve the remediation program from a database storing a plurality of remediation programs, said retrieved remediation program being selected in accordance with the software vulnerability identified in the management information.

The management system may be configured to disable at least part of the computer network in response to receiving management information indicating the presence of a software vulnerability.

The management system may send an alert message to the or each computer system on which a vulnerability is identified in response to receiving management information indicating the presence of a software vulnerability. Indeed, the interrogation program can also be configured to cause such an alert to be displayed.

The management system may remotely stop the operation of the at least one interrogation program operating on the computer systems.

According to a third aspect of the invention, there is provided a computer program stored on a non-transitory computer usable medium, the computer program comprising computer-readable instructions arranged to operate under the control of a processing means so as to identify a software vulnerability on a computer system, the computer program performing the steps of: applying an interrogation program to software stored on the computer system, the interrogation program being capable of exploiting a known software vulnerability if it is present in the software to which the interrogation program is applied; and in the event that the software is exploited by the interrogation program, operating the interrogation program to generate a set of management information from which can be derived at least the identification of the computer system on which the software vulnerability was exploited, the computer program being capable of sending the generated management information over a computer network.

According to a fourth aspect of the invention, there is provided computer program stored on a non-transitory computer usable medium, the computer program comprising computer-readable instructions arranged to operate under the control of a processing means so as to identify software vulnerabilities in a computer network to which the processing means is connected, the computer network comprising a plurality of computer systems having software stored thereon, the computer program performing the steps of: (a) sending at least one interrogation program to each computer system, the at least one interrogation program being arranged to (i) exploit a known software vulnerability if it is present in the software of the computer system to which the interrogation program is applied, and (ii) operate the interrogation program to generate management information at the computer system on which the known software vulnerability is exploited, the management information identifying the computer system and the particular software vulnerability present on that computer system; and (b) receiving management information generated by each interrogation program.

The computer program may be arranged to generate, in accordance with the received management information, a database of computer systems on the computer network which have particular software vulnerabilities.

The management information received may include a respective network address associated with each computer system on which the software vulnerability was identified. The network address may be the IP address of the respective computer system.

The or each interrogation program sent by the computer program may be further capable of remediating the software vulnerability it is capable of identifying, and wherein in the event that the interrogation program identifies a software vulnerability, the interrogation program may operate to remediate said software vulnerability.

In response to receiving management information from an interrogation program indicating the presence of a particular software vulnerability, the computer program may operate so as to acquire a remediation program appropriate to the particular software vulnerability and then send said retrieved remediation program to the interrogation program.

According to a fifth aspect of the invention, there is provided a computer program stored on a non-transitory computer usable medium, the computer program comprising computer-readable instructions arranged to operate under the control of a processing mean so as to identify a software vulnerability on a computer system having software stored thereon, the computer program being arranged: to interrogate the software of the computer system to detect the presence of a known software vulnerability if it is present in the software; in the event that a vulnerability is detected, to generate a set of management information from which can be derived the identification of the computer system; and to send the management information to a computer network.

According to a sixth aspect of the invention, there is provided a computer network comprising: a scanning system; a management system; and a plurality of computer systems, the scanning system being arranged to send at least one interrogation program to each of the computer systems, the at least one interrogation program being arranged to exploit a known software vulnerability if it is present in the software of a computer system to which the interrogation program is applied, to generate management information in the event that a known software vulnerability is exploited, and to send the generated management information to the management system, the management information identifying the computer system on which the known vulnerability was exploited and the particular software vulnerability present on that computer system.

The invention will now be described, by way of example, with reference to the drawings.

DETAILED DESCRIPTION OF A PREFERRED EMBODIMENT

Figure 1:
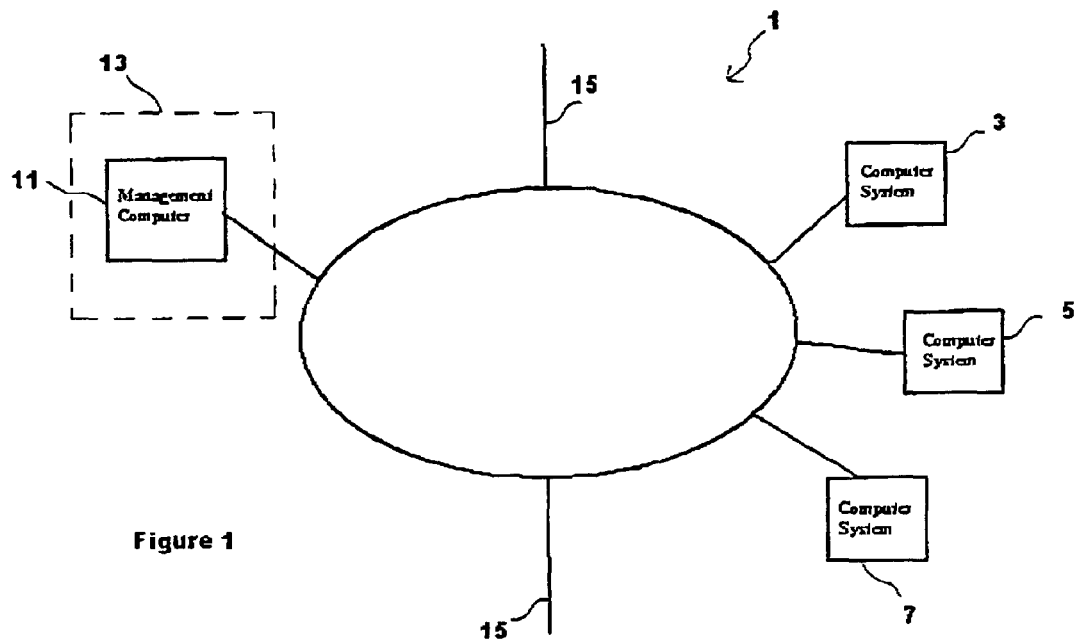
FIG. 1 is a schematic diagram of a computer network.

Referring to FIG. 1, a computer network 1 has first, second and third computer systems 3, 5, 7, and a management computer 11. The management computer 11 is typically located remotely from the first to third computer systems 3, 5, 7 and may be operated under the control of IT department staff. Indeed, in this example, the remote location of the management computer 11 is represented by the dotted line 13. Although only first to third computer systems 3, 5, 7 are shown, it will be appreciated that many other computer systems can be connected to the computer network 1, either directly, or by means of other network links 15. Each of the first to third computer systems 3, 5, 7 has a number of software programs stored thereon which are executed by processing means of each respective computer system. For example, each of the first to third computer systems 3, 5, 7 may be provided with an operating system, a word processing package, and a web server which enables connection to the Internet.

Figure 2:
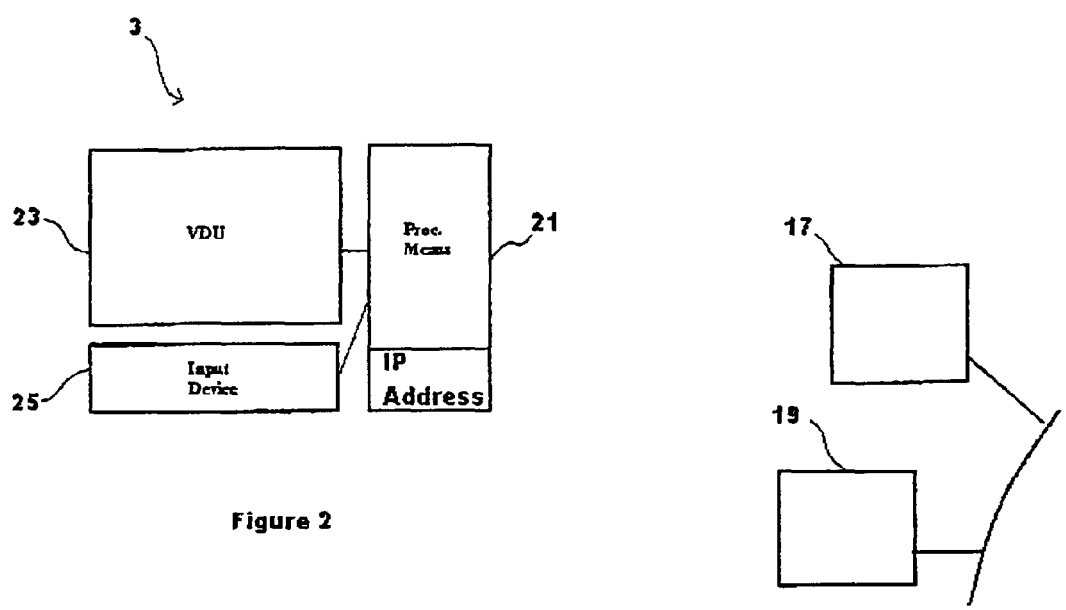
FIG. 2 is a block diagram of a computer system connected to the computer network represented in FIG. 1.

FIG. 2 is a generalised block diagram showing the functional elements of the first computer system 3, although it should be understood that the second and third computer systems 5, 7 have the same elements. Referring to FIG. 2, the first computer system 3 comprises a processing means 21, a visual display unit (VDU) 23, and input means 25. The processing means 21 is programmed with a network address in the form of an IP address. It will be appreciated that the IP address can be used by computer systems on the computer network 1, including the management computer 11, to communicate with the first computer system 3. Indeed, the IP address enables the management computer 11 to connect with the first computer system 3 without requiring knowledge of its physical location. The processing means of the second and third computer systems 5, 7 are programmed with different respective IP addresses. As mentioned previously, it is possible for the same IP address to be assigned to different machines at different times.

The function of the management computer 11 is at least to identify software vulnerabilities present on the software programs running on the first to third computer systems 3, 5, 7. In a further embodiment, described below, the management computer 11 is also arranged to remediate, i.e. mitigate, the or each software vulnerability it is able to identify.

As will be discussed further below, the management computer 11 is specifically configured to identify a plurality of known software vulnerabilities. In this respect, it will be appreciated that when a software vulnerability is initially discovered, which may be as a result of legitimate investigations by software engineers, details of the software vulnerability may be made available so that an appropriate remediation operation can be applied or developed to mitigate the vulnerability, for example by removing the vulnerability or at least making it difficult to take advantage of the vulnerability. Knowledge of the software vulnerability also enables the formulation of programs which are specifically designed to take advantage of, or exploit, the known vulnerability thereby to enable unauthorised operations to be performed on the software, e.g. by means of a virus attack. Indeed, a software vulnerability may only be discovered by the public at large when such a virus attack is discovered on a computer system. In the embodiments described herein, such an exploitation method is used to identify whether or not that software vulnerability is present.

Figure 3:
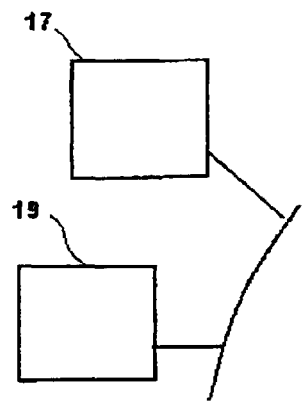
FIG. 3 shows a modified part of the computer network represented in FIG. 1.

The management computer 11 shown in FIG. 1 is a single processing system that performs two main functions. One function is that of scanning each of the first to third computer systems 3, 5, 7 in order to identify whether a software vulnerability is present in the software running thereon. A second function is that of collecting management information, at least from those computer systems on which a software vulnerability is discovered. In functional terms, therefore, the management computer 11 may be considered a single processing system operating a scanning system and a data management system. In an alternative arrangement, indicated in FIG. 3, separate first and second processing means 17, 19 may be used, the first processing means being arranged to perform the scanning operation and the second processing means being arranged to collect the management information.

Figures 4, 5:
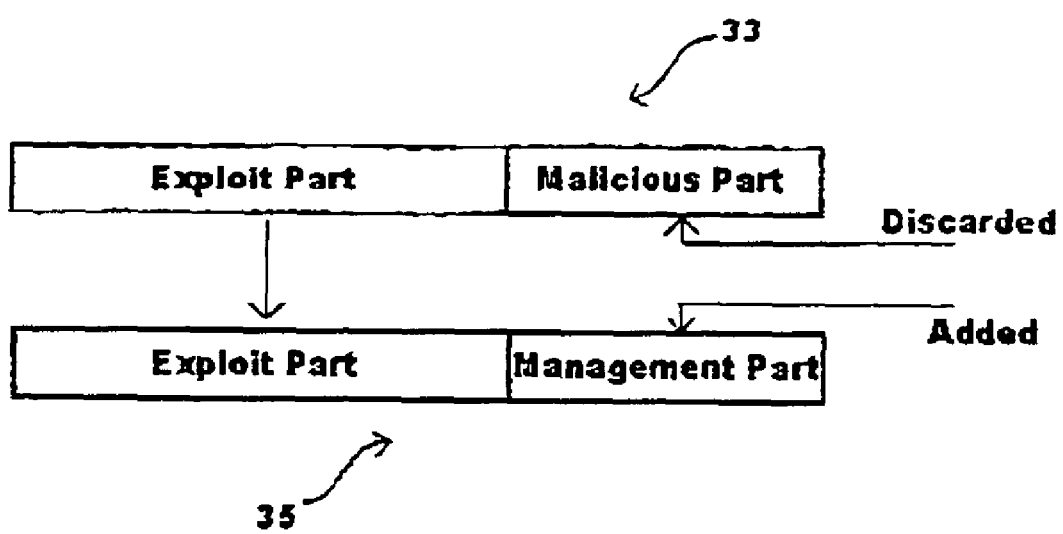
FIG. 4 is a block diagram representing a database for storing so-called 'exploit programs'.
FIG. 5 is a block diagram indicating a design process for generating an exploit program.

As mentioned above, the management computer 11 is arranged to scan each of the first to third computer systems 3, 5, 7 in order to identify whether a software vulnerability is present. This scanning operation is performed by accessing a database of interrogation programs, hereafter referred to as "exploit programs", and applying those exploit programs to the first to third computer systems 3, 5, 7. FIG. 4 shows an exemplary database 29 of exploit programs. The database 29 can be stored internally within the management computer 11, or externally from the management computer (assuming that appropriate security measures had been taken). As will be seen, in this case, the database 29 stores four different exploit programs, referred to as $E_1$-$E_4$, each of which is specifically designed to exploit a different known software vulnerability Vn, labelled $V_1$-$V_4$ respectively. The presence of one of the software vulnerabilities $V_1$-$V_4$ on any of the first to third computer systems 3, 5, 7 will be identified in the event that one of the exploit programs $E_1$-$E_4$ successfully exploits software on one of the computer systems. When this occurs, the 'successful' exploit program on the exploited computer system to generate management information which is then sent back to the management computer 11 over the computer network 1. The management information will indicate the identity of the computer system on which the vulnerability was exploited, for example by using the IP address of that computer system. The management computer 11 is then able to establish which of the first to third computer systems 3, 5, 7, if any, has particular software vulnerabilities.

The management computer 11 may scan each of the first to third computer systems 3, 5, 7 concurrently, i.e. so that the exploit programs $E_1$-$E_4$ are applied to each of the first to third computer systems in parallel. In computer networks having much larger numbers of computer systems, it may be appropriate to divide the scanning process in a controlled manner, for example by limiting the scanning operation to particular ranges of IP address.

As already mentioned, each exploit program $E_1$-$E_4$ is designed based on knowledge of the particular software vulnerability it is required to exploit.

One method of designing an exploit program is to identify an already-available program, such as a computer virus, which is known to be capable of exploiting the software vulnerability. The malicious program is then reverse engineered to identify an "exploit part" of the program, which allows the software vulnerability to be accessed, and a "malicious part" of the program, which performs the malicious operation on the accessed software. The "malicious part" is then discarded and replaced with a "management part" which performs the task of generating the management information for sending back to the management computer 11. The "management part" can be designed to perform a number of useful management tasks and has to be carefully coded so as not to cause problems once the exploit program has accessed the software. For example, the "management part" will not usually allow the exploit program to propagate to further computer systems which may cause problems if the propagation becomes uncontrollable. As will be discussed further below, the "management part" can also include remediation means to remove or mitigate the exploited software vulnerability. FIG. 5 illustrates the method described above wherein a malicious program 33 is reverse engineered to identify the "exploit part" and the "malicious part", the former being used in an exemplarily exploit program 35 along with a "management part".

A further method of designing an exploit program is simply to start from first principles. Once it is understood how and why a software vulnerability makes the software susceptible to an attack, a computer program is designed which is able take advantage of the vulnerability. This method is generally more time consuming.

Figure 6:
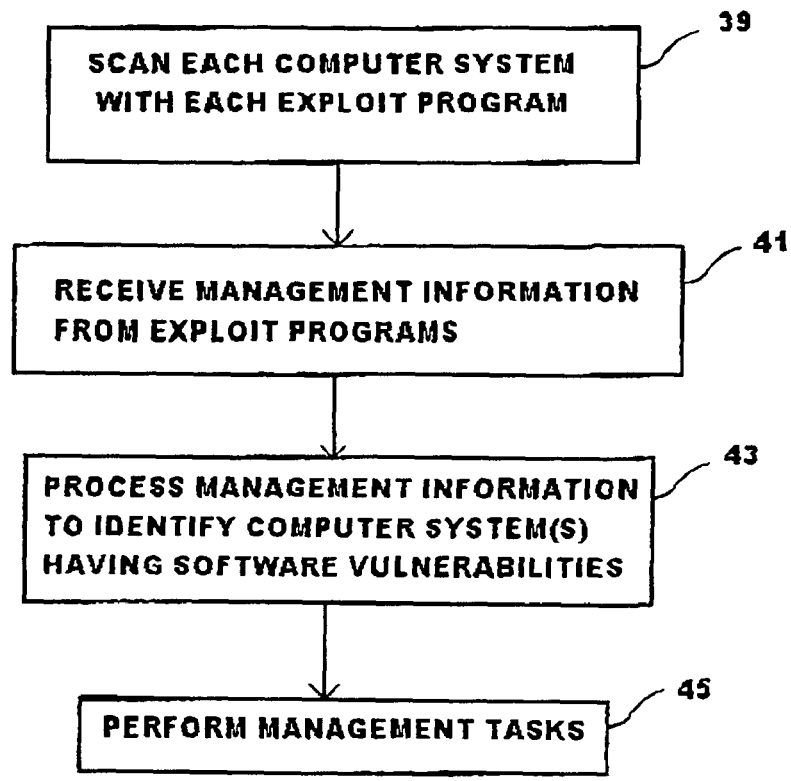
FIG. 6 is a flow chart showing the operating steps of computer software running on a management computer of the computer network represented in FIG. 1.
Figure 7:
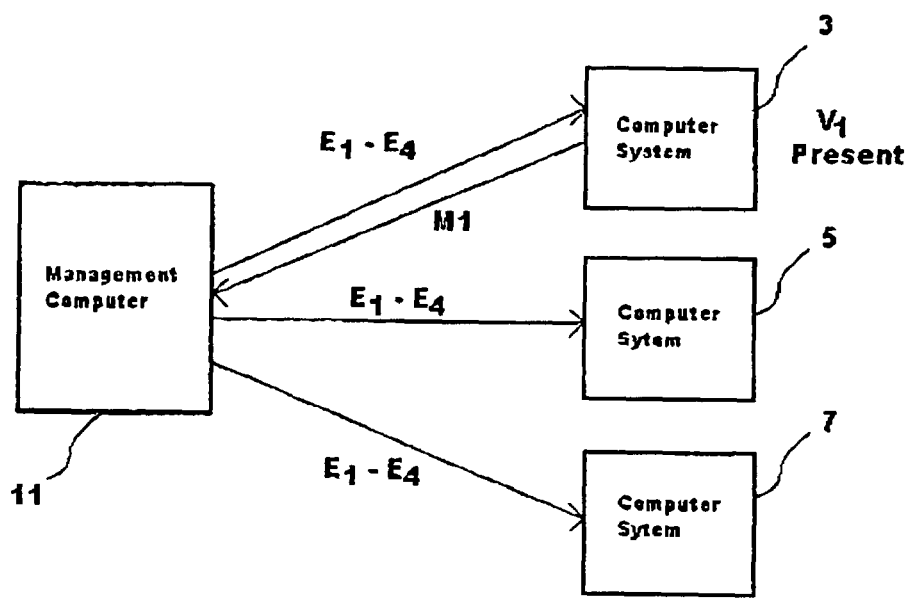
FIG. 7 is a schematic diagram of the computer network represented in FIG. 1 in the case that a software vulnerability is present on a computer system connected to the network.

The general operation of the management computer 11 will now be described with reference to the flow chart of FIG. 6 and the schematic network diagram of FIG. 7. The different steps indicated in the flow chart of FIG. 6 may be implemented in a computer program configured to run on the management computer 11.

In a first step 39, each of the first to third computer systems 3, 5, 7 is scanned by the management computer 11 by means of it applying each exploit program $E_1$-$E_4$ to software running on those computer systems. The general operation of each exploit program $E_1$-$E_4$ will be described further below. In a second step 41, the management computer 11 waits for receipt of any management information which is generated by each exploit program $E_1$-$E_4$ in order to indicate that it has exploited a particular software vulnerability. Upon receiving such management information, in a third step 43, processing of the received management information is performed to identify which of the first to third computer systems 3, 5, 7 have particular software vulnerabilities. In a final step 45, management tasks are performed based on knowledge of the management information processed in the third step 43. Referring to FIG. 6, in the exemplary case shown, a software vulnerability $V_1$ is identified on the first computer 3 by the exploitation program $E_1$ and so management information is generated at the first computer 3 and sent back to the management computer 11. Since the management information is returned by the exploitation program $E_1$ and will indicate that it is sent from the first computer 3, the management computer 11 will determine that the first computer has the software vulnerability $V_1$.

The management tasks performed in step 45 may include sending a message to a user of the relevant computer system, informing them of the presence of the vulnerability, and indicating further action that should be taken. This may involve notifying the user that an appropriate remediation program can be applied and where the remediation program is stored. Alternatively, the remediation program can be sent to the user as an attachment to an email message. The management operation may involve shutting the relevant computer system down, or even disabling part of the computer network to which the relevant computer system is connected. Given that a software vulnerability has been identified, it may be useful to apply a virus-checking program to the relevant computer system so as to determine whether that computer system has already been exploited by malicious code.

Figures 8, 9:
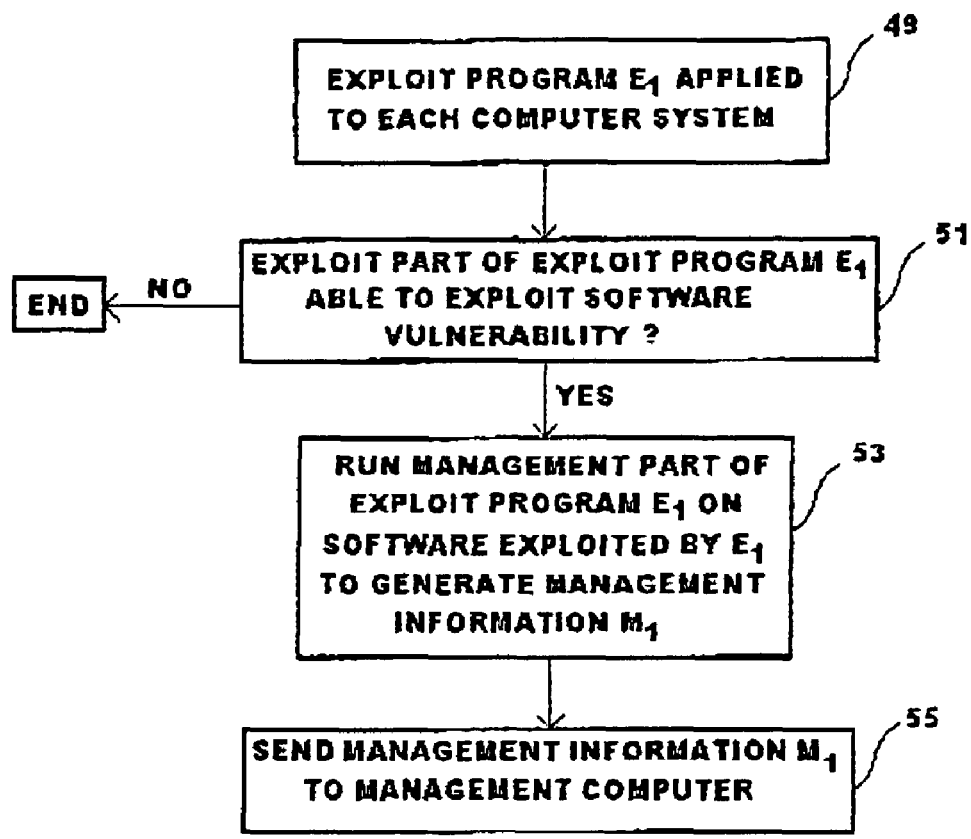
FIG. 8 is a flow chart showing the operating steps of an exploit program used by the computer software running on the management computer.
FIG. 9 is a block diagram representing a database for storing modified exploit programs for use in a method according to a further embodiment of the invention.

The general operation of a first one of the exploit programs, $E_1$, will now be described with reference to the flow chart of FIG. 8. It will be appreciated that the second to fourth exploit programs $E_2$-$E_4$ will operate in substantially the same way. As with the schematic network diagram of FIG. 7, the first computer 3 is assumed to have the software vulnerability $V_1$ which can be exploited by the first exploit program $E_1$.

In a first step 49, the first exploit program $E_1$ is applied to each of the first to third computer systems 3, 5, 7. In a second step, 51, the first exploit program $E_1$ attempts to access software running on each of the first to third computer systems 3, 5, 7 by means of the software vulnerability $V_1$. In the event that the first exploit program $E_1$ is successful, as will be the case with the first computer 3, a third step 53 is entered whereby a "management part" of the exploit program runs on the accessed software of the first computer 3 to generate management information $M_1$ for sending back to the management computer 11. In a fourth step 55, the generated management information $M_1$ is sent to the management computer 11. The operation of the management computer 11 thereafter has already been described above with reference to FIG. 7. In the event that the first exploit program $E_1$ does not successfully access the software, as will be the case with the second and third computer systems 5, 7, the exploit program ends.

The "management part" of the exploit program $E_1$ is arranged to generate at least an indication of the 'relevant' computer system on which the vulnerability $V_1$ is present. In this embodiment, the IP address of the first computer system 3 is used, although other identification means could be used. Use of the IP address is particularly advantageous since the management computer 11 does not need to know the physical location of the first computer system 3 or even the identity of the user operating the first computer system. Using the IP address enables data communications between the management computer 11 and the first computer 3 over the computer network 1. Thus, the management computer 11 can establish contact with the first computer 3 and perform any management tasks deemed necessary. As mentioned above, these management tasks may involve alerting a user that a vulnerability exists, or even shutting that computer system down. This is done electronically and so very rapidly.

The "management part" of the exploit program $E_1$ may further be arranged to generate other forms of management information. This information may give further details on the vulnerability so identified, or whether the computer system is also infected by malicious code, such as a worm or virus. It may also be desirable to know the time when the software vulnerability was identified. The management computer 11 may then send a message to the relevant computer system giving users thereof a finite time limit from the 'time of identification' to remedy the vulnerability before the computer system is shut down. The "management part" may attempt to discover likely users of the relevant computer system so that an email can be sent to those users' own email addresses. This may be performed by the management part interrogating log-in files and/or email in-boxes. The "management part" may also assess the hardware and software configurations of the relevant computer system to assess any damage that has already been done.

Second and third preferred embodiments of the invention will now be described with reference to FIGS. 9 to 12. In these embodiments, the management computer 11 is further configured to apply remediation means to those computer systems on which a software vulnerability is identified. As mentioned above, knowledge of the existence of a software vulnerability enables the design of software for remediating that vulnerability. Remediation may involve attempting to remove the vulnerability, either fully or partially, or at least changing the vulnerability in some way so that the task of exploiting it is made more difficult. Partial remediation may be preferable if the complete remediation requires a relatively large piece of software that cannot be transported efficiently over the computer network 1. Partial remediation may also be preferable if complete remediation requires actions that cannot be reliably carried out without some form of human interaction In the second preferred embodiment, each exploit program $E_1$-$E_4$ in the database 29 shown in FIG. 4 is modified so that an additional "remediation payload" part $R_1$-$R_4$ is included. $R_1$ is arranged to remediate the software vulnerability which can be exploited by $E_1$, $R_2$ is arranged to remediate the software vulnerability which can be exploited by $E_2$, and so on. A database 29' storing the modified exploitation programs $E_1'$-$E_4'$ is represented in FIG. 9.

Figure 10:
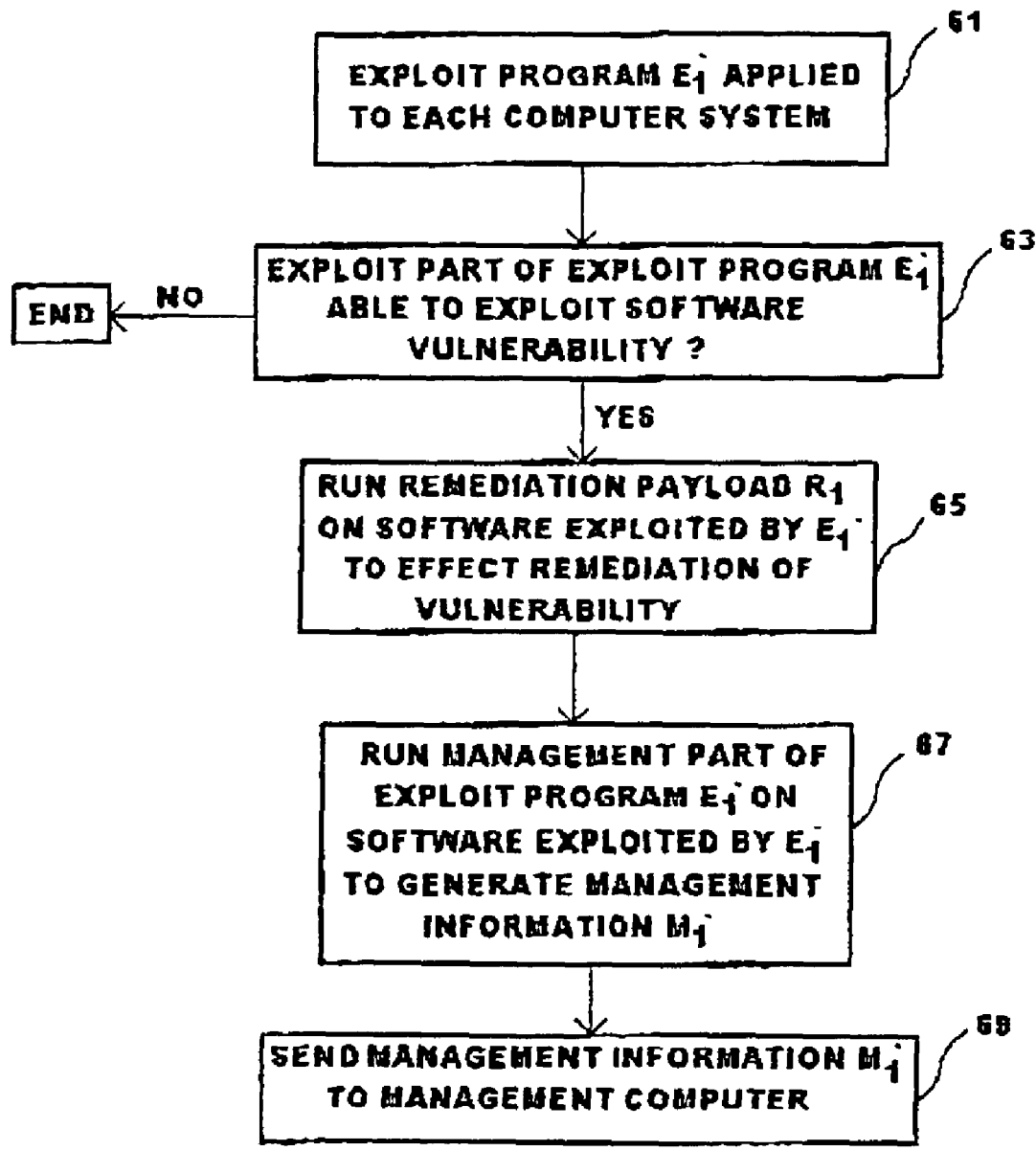
FIG. 10 is a flow chart showing the operating steps of a modified exploit program.

The general operation of a first one of the modified exploit programs, $E_1'$, will now be described with reference to the flow chart of FIG. 10. It will be appreciated that the second to fourth modified exploit programs $E_2'$-$E_4'$ will operate in substantially the same way as $E_1'$. As with the case shown in FIG. 6, the first computer 3 is assumed to have the software vulnerability $V_1$.

In a first step 61, the first exploit program $E_1'$ is applied to each of the first to third computer systems 3, 5, 7. In a second step, 63, the first exploit program $E_1'$ attempts to access software running on each of the first to third computer systems 3, 5, 7 by means of a known software vulnerability $V_1$. In the event that the exploit part of the first exploit program $E_1'$ is successful, as will be the case with the first computer 3, a third step 65 is entered whereby the remediation payload $R_1$ of the first exploit program $E_1'$ is executed on the accessed software so as to run a remediation operation. In a fourth step 67, the "management part" of the exploit program $E_1'$ runs on the accessed software of the first computer 3 to generate management information $M_1'$ for sending back to the management computer 11. In a fifth step 69, the generated management information $M_1'$ is sent to the management computer 11. The management information $M_1'$ may include details of the remediation operation performed. In the event that the first exploit program $E_1'$ does not successfully access the software, as will be the case with the second and third computer systems 5, 7, the exploit program ends.

Figure 11:
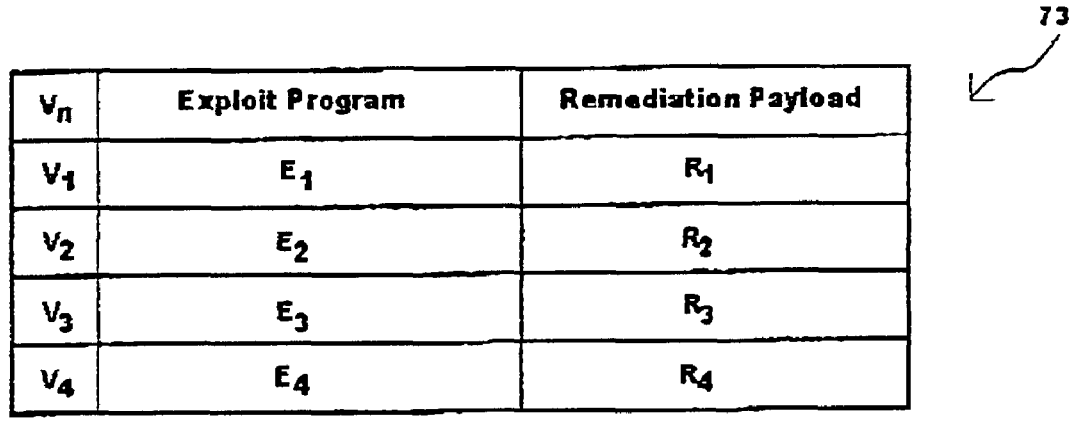
FIG. 11 is a block diagram representing a database for storing modified exploit programs for use in a method according to a yet further embodiment of the invention.
Figure 12:
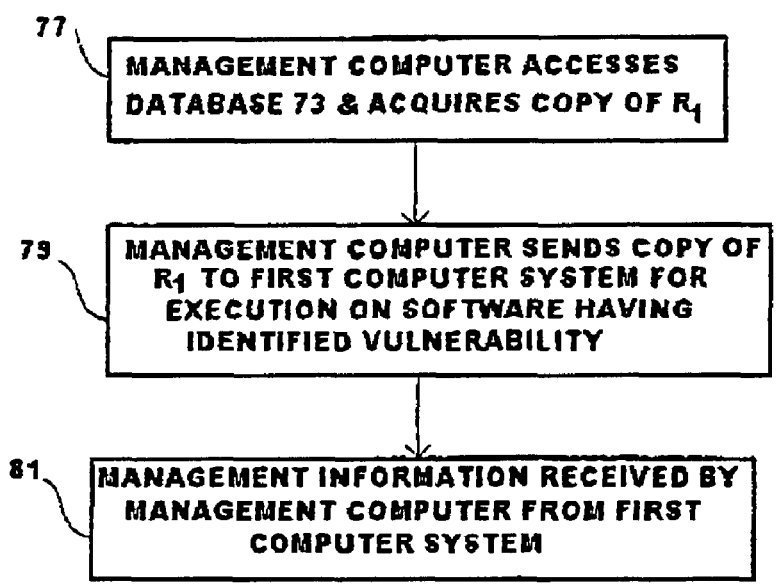
FIG. 12 is a flow chart showing the operating steps of computer software running on the management computer of the computer network, the management computer operating according to the yet further embodiment of the invention.

A third preferred embodiment of the invention will now be described with reference to FIGS. 11 and 12 This third embodiment is similar to the second embodiment in that the management computer 11 is configured to apply remediation means to those computer systems on which a software vulnerability is identified. However, rather than including an appropriate remediation payload with the sent exploit program, a remediation payload is sent separately to one or more of the first to third computer systems 3, 5, 7 in accordance with the software vulnerabilities identified thereon. To facilitate this, each exploit program $E_1$-$E_4$ is associated with a respective remediation payload $R_1$-$R_4$. As with the second embodiment, $R_1$ is arranged to remediate the software vulnerability which can be exploited by $E_1$, $R_2$ is arranged to remediate the software vulnerability which can be exploited by $E_2$, and so on. An exemplary database 73 storing the exploit programs and their associated payloads is represented in FIG. 11.

In this case, remediation of an identified software vulnerability is effected by means of the management computer 11 fetching the appropriate remediation payload in accordance with the vulnerability identified in the management information. FIG. 12 shows the steps involved in performing the remediation operation, taking the situation shown in FIG. 7 as an example. The steps illustrated in FIG. 7 may be considered an example of a management task performed in the fourth step 45 of FIG. 6. It is assumed that the management computer 11 has received management information $M_1$ indicating that the first computer system 3 has the software vulnerability $V_1$.

In a first step 77, the management computer 11 accesses the database 73 and acquires a copy of the remediation payload $R_1$. In a second step 79, and the remediation payload is sent to the first computer system 3. The remediation payload $R_1$ is applied to the first computer system 3 and executed. In a third step 81 further management, indicative of the remediation operation performed, is sent back to the management computer 11.

As mentioned above, with reference to FIG. 3, instead of employing a single management computer 11 to perform the scanning operation and collection of management information, it is possible to use separate first and second processing means 17, 19. In this arrangement, the second processing means 19 acquires the appropriate remediation payload $R_1$ in response to receiving the management information from one of the first to third computer systems 1, 3, 7.

When applying the appropriate remediation means to one of the first to third computer systems 1, 3, 7 it is not essential to access the software of the computer system using the software vulnerability so identified. Indeed, any other vulnerability or corporate access agent/backdoor can be used to access the software and remediate the vulnerability so identified.

What is claimed is:

1. A computer program stored on a non-transitory computer usable medium, the computer program comprising computer-readable instructions arranged to operate under the control of a processing means so as to identify a software vulnerability on a computer system, the computer program performing the steps of:
   selecting one or more computer systems to be scanned for a software vulnerability;
   applying an interrogation program to software stored on the computer system, the interrogation program being capable of exploiting a known software vulnerability if it is present in the software to which the interrogation program is applied; and
   in the event that the software vulnerability is exploited by the interrogation program, operating the interrogation program to generate a set of management information from which can be derived at least an identification of the computer system on which the software vulnerability was exploited, the computer program being capable of sending the generated set of management information over a computer network,
   wherein the interrogation program is further arranged to remediate the known software vulnerability in response to it being identified.

2. A computer program stored on a non-transitory computer usable medium, the computer program comprising computer-readable instructions arranged to operate under the control of a processing means so as to identify software vulnerabilities in a computer network to which the processing means is connected, the computer network comprising a plurality of computer systems having software stored thereon, the computer program performing the steps of:
   (a) sending at least one interrogation program to each computer system selected by a user to be scanned for a software vulnerability, the at least one interrogation program being arranged to exploit a known software vulnerability if it is present in the software of the computer system to which the interrogation program is applied, and operating the at least one interrogation program to generate management information at the computer system on which a known software vulnerability is exploited, the management information identifying the computer system and the particular software vulnerability present on that computer system; and
   (b) receiving management information generated by each interrogation program, wherein the at least one interrogation program sent by the computer program is further capable of remediating the software vulnerability it is capable of identifying, and wherein in the event that the interrogation program identifies a software vulnerability, the interrogation program operates to remediate said software vulnerability.

3. A computer program according to claim 2, wherein the computer program is arranged to generate, in accordance with the received management information, a database of computer systems on the computer network which have particular software vulnerabilities.

4. A computer program according to claim 2, wherein the management information includes a respective network address associated with each computer system on which the software vulnerability was identified.

5. A computer program according to claim 4, wherein the network address is an IP address of the respective computer system.

6. A computer program according to claim 2, wherein, in response to receiving management information from an interrogation program indicating the presence of a particular software vulnerability, the computer program receives a remediation program appropriate to the particular software vulnerability and sends said retrieved remediation program to the interrogation program.

7. A computer program stored on a non-transitory computer usable medium, the computer program comprising computer-readable instructions arranged to operate under the control of a processing mean so as to identify a software vulnerability on a computer system having software stored thereon, the computer program being arranged:

to interrogate the software of the computer system to detect the presence of a known software vulnerability if it is present in the software, wherein the computer system is designated by a user to be scanned for a software vulnerability;

in the event that a vulnerability is detected, to generate a set of management information from which can be derived an identification of the computer system; to send the set of management information to a computer network; and to remediate the known software vulnerability in response to it being identified.

8. A computer network comprising:

a scanning system;

a management system; and a plurality of computer systems, the scanning system being arranged to send at least one interrogation program to each of the computer systems selected by a user to be scanned for a software vulnerability, the at least one interrogation program being arranged to exploit a known software vulnerability if it is present in software of a computer system to which the interrogation program is applied, to generate management information in the event that a known software vulnerability is exploited, and to send the generated management information to the management system, the management information identifying the computer system on which the known vulnerability was exploited and the particular software vulnerability present on that computer system, wherein the at least one interrogation program is further arranged to remediate the known software vulnerability in response to it being identified.

9. A method of identifying a software vulnerability on a computer system having software stored thereon, the computer system being connected to a management system over a computer network, the method comprising:

selecting one or more computer systems to be scanned for a software vulnerability;

applying an interrogation program to the software, the interrogation program being capable of exploiting a known software vulnerability if it is present in the software to which the interrogation program is applied;

in the event that a software vulnerability is exploited by the interrogation program, operating the interrogation program to generate a set of management information from which can be derived the identification of the computer system having the software vulnerability; and sending the set of management information to the management system via the computer network, wherein the interrogation program is further arranged to remediate the known software vulnerability in response to it being identified, and, wherein the management system selects the interrogation program that is applied to the software.

10. A method of identifying a software vulnerability on a computer system having software stored thereon, the computer system being connected to a management system over a computer network, the method comprising:

selecting one or more computer systems to be scanned for a software vulnerability;

applying an interrogation program to the software, the interrogation program being capable of (i) exploiting a known software vulnerability if it is present in the software to which the interrogation program is applied and (ii) remediating the known software vulnerability it is arranged to exploit:

in the event that a software vulnerability is exploited by the interrogation program, operating the interrogation program to remediate the software vulnerability so exploited and generate a set of management information from which can be derived an identification of the computer system having the software vulnerability; and sending the set of management information to the management system via the computer network, wherein the management system selects the interrogation program that is applied to the software.

* * * * *